W. H. TAMBLING.
Milk Safe.
No. 25,773.
Patented Oct. 11, 1859.
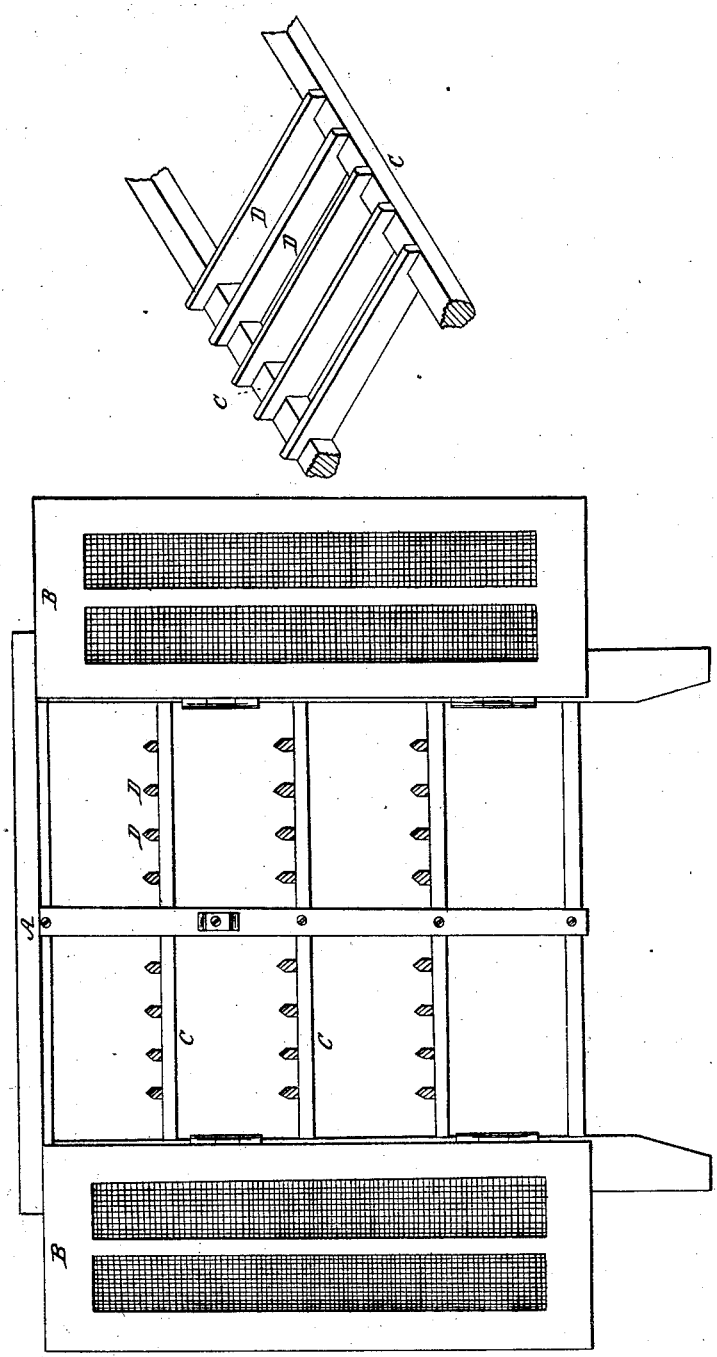

UNITED STATES PATENT OFFICE.

WILLIAM H. TAMBLING, OF BERLIN, WISCONSIN.

MILK-SAFE.

Specification of Letters Patent No. 25,773, dated October 11, 1859.

*To all whom it may concern:*

Be it known that I, WM. H. TAMBLING, of Berlin, in the county of Green Lake and the State of Wisconsin, have invented certain new and useful Improvements in Milk-Safes; and I do hereby declare the following to be a full, clear, and exact description of the same, reference being had to the accompanying drawings and to the letters of reference marked thereon.

The nature of my improvement consists in constructing milk safes in the peculiar manner which will be hereinafter fully described.

To enable others skilled in the art to make and use my invention, I will now describe its construction and operation.

In the drawings—Figure (1) is a side elevation. Fig. (2) shows the character of the partitions.

In Fig. (1,) (A,) represents a safe of the ordinary construction—the sides of which are covered with gauze wire.

(B, B,) represent the doors which are also covered with the same material as fully shown in the drawings.

(C, C,) are longitudinal slats as more fully shown in Fig. (2,) said slats are supported at both ends of the safe.

(D, D,) represent cross-slats which are placed at intervals of about two inches or more from each other. The distance between the slats, however, may be regulated as necessity requires or convenience suggests. These slats are beveled to a point on their top, as fully shown by their end views in Fig. (1,). This is done in order to present as small a wooden surface to the crocks—when placed upon them—as possible, which is found to be very desirable. Said slats may be either adjustable or permanently secured. The advantage arising from this mode of constructing milk safes is that a more free circulation of air is obtained on the inside than when constructed in the ordinary mode, that is of having plank partitions for shelving instead of the adjustable or permanent slats.

Having thus fully described my invention what I claim as new and desire to secure by Letters Patent is—

The within described safe as an article of manufacture constructed in the particular manner set forth—to wit, with gauze wire sides, and doors, and with shelves which consist of longitudinal slats C, C, to which are secured a series of wooden cross slats D, D, which are made broad at their base, and beveled to an edge, on their tops, the whole being arranged together, and used in the manner and for the purpose specified.

WILLIAM H. TAMBLING.

Witnesses:
 O. F. SILVER,
 D. F. TAMBLING.